United States Patent [19]

Eckberg

[11] 4,256,870

[45] Mar. 17, 1981

[54] SOLVENTLESS RELEASE COMPOSITIONS, METHODS AND ARTICLES OF MANUFACTURE

[75] Inventor: Richard P. Eckberg, Round Lake, N.Y.

[73] Assignee: General Electric Company, Waterford, N.Y.

[21] Appl. No.: 40,015

[22] Filed: May 17, 1979

[51] Int. Cl.³ .................... C08G 77/20; C08G 77/12; C08L 83/06

[52] U.S. Cl. ...................................... 528/15; 428/429; 428/947; 428/452; 525/478; 525/479; 528/12; 528/26; 528/31

[58] Field of Search .................. 525/478, 479; 528/15, 528/12, 26, 31

[56] References Cited

U.S. PATENT DOCUMENTS

| B 528,966 | 2/1976 | Lee et al. ...................... 260/448.2 Q |
| 3,445,420 | 5/1969 | Kookootsedes et al. ............... 260/37 |
| 3,461,185 | 8/1969 | Brown ................................... 528/15 |
| 3,730,932 | 5/1973 | DeZuba et al. ................ 260/29.1 SB |
| 3,759,968 | 9/1973 | Berger et al. .................. 260/448.2 Q |
| 3,882,083 | 5/1975 | Berger et al. .......................... 525/479 |
| 4,043,977 | 8/1977 | deMontigny et al. .................. 428/447 |
| 4,061,609 | 12/1977 | Bobear ................................. 525/478 |
| 4,077,943 | 3/1978 | Sato et al. ............................ 525/478 |

*Primary Examiner*—Wilbert J. Briggs, Sr.
*Attorney, Agent, or Firm*—John L. Young; E. Philip Koltos; Michael J. Doyl

[57] ABSTRACT

A solventless release coating composition is provided as well as a method for rendering materials nonadherent to other materials which would normally adhere thereto. The coating composition is a platinum-metal-complex catalyzed silicone composition comprising a vinyl or silanol functional polysiloxane base polymer and a methylhydrogen crosslinking agent. Diallylmaleate is added to the composition in order to extend the useful shelf-life of the product by inhibiting any premature crosslinking reactions; the useful pot-life at ambient temperatures of the catalyzed composition can also be extended.

20 Claims, No Drawings

SOLVENTLESS RELEASE COMPOSITIONS, METHODS AND ARTICLES OF MANUFACTURE

BACKGROUND OF THE INVENTION

The present invention relates to polysiloxane compositions with an inhibitor which are particularly well suited for coating applications and are especially useful in the manufacture of paper and other articles having release coatings.

Silicone compositions have long been used for rendering surfaces nonadherent to materials which would normally adhere thereto. For a long time, it was necessary that these silicone coatings be applied as a dispersion within a solvent in order to control the viscosity of the coating material so as to be suitable for coating applications. However, although the solvent aids in the application of the coating, it is a highly inefficient process inasmuch as the solvent must thereafter be evaporated. The evaporation of solvents requires large expenditures of energy and pollution control requirements mandate that solvent vapors be prevented from escaping into the air. Removal and recovery of all the solvent entail considerable expenditure for apparatus and energy.

Thus, it has been noted that there is a need to provide a solventless coating composition which will, however, remain easy to apply to the substrate. Such solventless coating compositions are sometimes referred to as "100% solids" compositions. The absence of solvent in such compositions both lowers the amount of energy required to effect a cure and eliminates the need for expensive pollution abatement equipment. The composition of the present invention is a low viscosity polydiorganosiloxane fluid which can readily be coated onto a substrate by standard methods such as blade, press, brush or gravure and which will thermally cure onto the substrate to form a nonadherent surface.

Release coatings are useful for many applications whenever it is necessary to provide a surface or material which is relatively nonadherent to other materials which would normally adhere thereto. Silicone paper release compositions are widely used as coatings which release pressure-sensitive adhesives for labels, decorative laminates, transfer tapes, etc. Silicone release coatings on paper, polyethylene, Mylar, and other such substrates are also useful as non-stick surfaces for food handling and industrial packaging applications.

For example, when labels are coated with an adhesive, it is desirable that the paper backing be easily peeled away from the label when it is ready for use, yet the adhesive quality of the label should not be derogated by the fact that it has been peeled away from the substrate upon which it was stored. The same principle applies to certain types of adhesive tapes which come in rolls. It is necessary that the tape unroll easily and still maintain its adhesive characteristics. This can be accomplished by coating the nonadhesive side of the tape with a silicone release composition which will come into contact with the adhesive as the roll of tape is manufactured.

Two problems previously encountered with silicone compositions of the above-described type are related to premature gelation of the composition. Inasmuch as a typical composition can be made up of a vinyl chainstopped base polymer, a crosslinking agent and a platinum metal catalyst, premature curing may occur over a length of time resulting in a product with unsatisfactory shelf-life. Furthermore, when the composition is ready for use, it is desirable that the catalyzed polymer composition have a sufficiently long pot-life to enable one skilled in the art to carry out the coating application. Thus, the coating composition of the present invention is provided with an inhibitor which effectively retards the hydrosilation addition cure reaction of these compositions at ambient temperature, but which does not retard the cure at elevated temperature.

Therefore, a primary object of the present invention is to provide a solventless composition which will render surfaces nonadherent to materials which would normally adhere thereto.

Another object of the present invention is to provide a solventless coating composition with a satisfactory shelf-life.

Another object of the present invention is to provide a solventless coating composition which has a satisfactory pot-life when it is ready for use.

Another object of the present invention is to provide a method of rendering materials nonadherent to other materials which would normally adhere thereto.

Another object is to provide articles of manufacture having nonadherent surfaces by coating the surfaces with the release compositions of the present invention.

Another object of the present invention is to provide a release coating composition having a one-part inhibitor which effectively retards the catalyzed crosslinking reaction at temperatures below the heat cure temperature of these compositions.

Another object of the present invention is to provide a solventless silicone composition which is particularly well suited for paper release applications.

SUMMARY OF THE INVENTION

The present invention involves a silicone composition comprising a base polymer such as a vinyl chainstopped polydialkyl-alkylvinyl polysiloxane base copolymer and a methylhydrogen crosslinking fluid. This composition is catalyzed by platinum or a platinum metal which will initiate an addition cure reation. Generally, any base polymer having alkenyl or silanol functionality will lend itself to the platinum metal catalyzed hydrosilation cure reaction of the present invention. An inhibitor such as diallylmaleate can be added to the composition in order to selectively retard the cure reaction so as to provide adequate shelf-life and workable pot-life for the coating composition. Also disclosed is an article of manufacture and a method for making same which involves rendering several types of substrates nonadherent through the application of the composition of the present invention.

DESCRIPTION OF THE PREFERRED EMBODIMENTS

The composition of the present invention is particularly well suited for rendering materials nonadherent to other normally adherent materials such as glue and adhesives. Additionally, the composition can be applied directly to a substrate without the need for a solvent, thus avoiding all of the problems associated with coating solvents as described above.

The composition is a polysiloxane made up of several ingredients which will thermally cure on the substrate upon which it is coated, and render the substrate nonadherent. A major proportion of the composition is typically a vinyl chainstopped polysiloxane having the formula

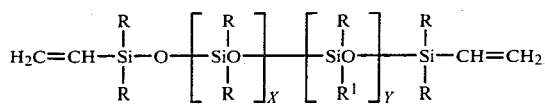

wherein R is a monovalent hydrocarbon radical free of unsaturation. Suitable radicals for R include, for example, methyl, ethyl, propyl, butyl, and other similar saturated hydrocarbons, but ordinarily would not include phenyl groups for paper release purposes. R' is a hydrocarbon radical having alkenyl unsaturation. Typically, R' represents vinyl groups but may also represent allylic or cyclo-alkenyl unsaturated groups. X and Y are positive integers so that the vinyl chain-stopped polysiloxane has up to approximately 20% by weight of R' groups. The viscosity of such a polysiloxane ranges from approximately 50 to approximately 100,000 centipoise at 25° C. Preferably, the vinyl chainstopped polysiloxane has up to approximately 20% by weight of vinyl groups represented by R' and the viscosity of this polymer ranges from approximately 300 to approximately 550 centipoise at 25° C. The preferred vinyl chainstopped polysiloxane has the formula

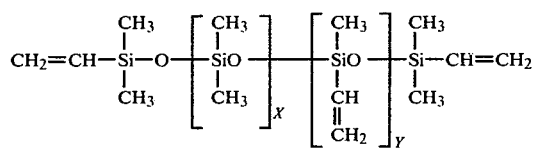

wherein X and Y are as described above.

Methylhydrogen fluid is often used by those skilled in the silicone art as a crosslinking agent for addition-cured silicone systems. Particularly useful as a crosslinking agent for the present invention is a trimethyl chainstopped polymethylhydrogen siloxane fluid having from approximately 10% to approximately 100% SiH groups and having a viscosity in the range of approximately 25 to approximately 1,000 centipoise at 25° C.

The curing reaction which takes place between the vinyl-functional polysiloxane and the polymethylhydrogensiloxane fluid crosslinking agent is an addition cure reaction, also known as a hydrosilation. The composition of the present invention may be thermally cured by means of a platinum catalyzed crosslinking reaction between pendant vinyl groups of a dialkylvinyl chainstopped polydialkyl-alkylvinylsiloxane copolymer and a trimethyl chainstopped polymethylhydrogen fluid.

A useful catalyst for facilitating the hydrosilation curing reaction is the Lamoreaux catalyst as described in U.S. Pat. No. 3,220,972 issued Nov. 30, 1965, and assigned to the same assignee as the present invention. Other platinum-metal catalysts can also be utilized in practicing the present invention and their selection depends upon such factors as speed of the reaction required as well as expense, useful shelf-life, useful pot-life and the temperature at which the cure reaction is to take place. Such platinum-metal catalysts include those which utilize the precious metals ruthenium, rhodium, palladium, osmium, iridium and platinum, and complexes of these metals. For coating compositions as described above, the amount of catalyst ranges from approximately 10 to approximately 500 ppm, again depending upon the factors of speed of reaction and cost. Preferably, the amount of catalyst is approximately 10–50 ppm of precious metal.

A vinyl chainstopped polysiloxane with a trimethyl chainstopped polymethylhydrogensiloxane fluid crosslinking agent thermally cures on a substrate and provides a nonadherent surface. However, it is necessary to include an inhibitor in the coating composition package in order to avoid the problems of premature cure described earlier. It has been found that diallylmaleate, which has a formula

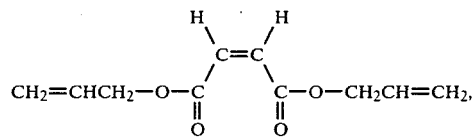

effectively inhibits the cure of these coating compositions at ambient temperatures below the heat cure temperatures of the compositions. The product thus exhibits a useful shelf-life of a year or more and does not experience premature crosslinking of the composition which would render it useless. Additionally, the product exhibits a workable pot-life in excess of the time ordinarily required to use the product. That is to say, at room temperature, this complete coating composition does not exhibit the premature gelling often associated with catalyzed silicone compositions. Furthermore, diallylmaleate does not exhibit the disadvantageous properties associated with previously used inhibitors. Diallylmaleate is a one-part hydrosilation inhibitor package as opposed to a two-part inhibitor package previously used which consisted of equal parts of vinyl acetate and triallyl-isocyanurate (TAIC). In this two-part inhibitor, the vinyl acetate is not only quite volatile, but is very flammable; and although TAIC is not very volatile, it is only barely soluble in the vinyl silicone base polymer utilized in practicing the present invention. Additionally, TAIC has not been as readily available in the United States market as the diallylmaleate inhibitor of the present invention.

It has been found that small amounts of diallylmaleate inhibitor permit exceptionally long catalyzed pot-life without sacrifice of cure performance in a solventless paper release system. Ordinarily, the effective amount of inhibitor ranges from approximately 0.1% to approximately 0.5% by weight. Use of the inhibitor of the present invention results in adequate shelf-life and pot-life yet the composition rapidly cures to a smear-free and migration-free abhesive or nonadherent surface when thermally cured.

A heat cure reaction can be initiated in many ways such as by infrared lamps or by radiation, but often a forced air oven is most suitable. The composition of the present invention can be applied to substrates in many ways such as by coating, spraying, brushing, application by blade or gravure processes. The present invention thus provides a method for rendering surfaces nonadherent to materials which would ordinarily adhere thereto by the application of the above-described compositions to a suitable substrate. Such substrates include glass, metal and metal foil, and fibrous materials, particularly paper. Any plastic which will not melt or deform at the temerature required to cure the composition of the present invention can also be rendered adhesive by application of the above-described composition to the plastic surface.

The diallylmaleate utilized by the present invention is a dialkyl carboxylic diester which results from the reaction of allylic alcohol and maleic acid. Other diallylic carboxylic esters such as diallylphthalate, and diallylsuccinate are chemically analogous to diallylmaleate and may also be utilized as hydrosilation inhibitors. Also, saturated dialkyl esters of maleic acid, such as dimethyl or diethyl maleate, are useful as hydrosilation inhibitors for these solventless paper release compositions, although diallylmaleate is preferred.

Platinum catalyzed addition-cured solventless release compositions can also be effectively inhibited by silylmaleates which are less effective than diallylmaleate in terms of workable pot-life, yet are sufficiently soluable in the siloxane base polymers to be useful as inhibitors for such products. An example of an effective silylmaleate inhibitor is bis-γ-propyltris (methoxy)silylmaleate having a formula:

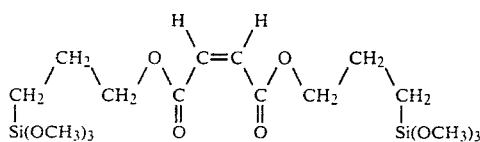

Effective levels of diallylmaleate are quite soluble in silicone fluids, and it is not significantly volatile, having a boiling point above 200° C. at atmospheric pressure. Additionally, diallylmaleate is readily available on the domestic market. Furthermore, inasmuch as the total inhibitor concentration in the diallylmaleate-inhibited polysiloxane amounts to about one-fourth the inhibitor concentration for blends of vinyl acetate and TAIC formerly used, the total cost is significantly reduced. Additionally, the small inhibitory amounts of diallylmaleate utilized by the present invention will be substantially wholly included within the crosslinked polymer. No free diallylmaleate is extant after the polymeric composition is cured. Thus, diallylmaleate is not subject to the problems previously encountered with the use of a two-part vinyl acetate and TAIC inhibitor.

As noted above, diallylmaleate will effectively inhibit the hydrosilation cure reaction for polysiloxane compositions having silanol functionality and will also inhibit the cure for those compositions exhibiting both silanol and vinyl functionality. A base polymer for such a composition can be, for example, a silanol chainstopped polydiorganosiloxane having pendant vinyl groups along the siloxane chain.

In order that those skilled in the art might be better able to practice the present invention, the following examples are given by way of illustration and not by way of limitation.

EXAMPLES 1 THROUGH 5

In the following examples, 100 parts of a dimethylvinyl chainstopped polydimethyl-methylvinylsiloxane copolymer having approximately 3% by weight vinyl groups and having a viscosity of approximately 250 centipoise at 25° C. was filtered to remove neutralization salts whereupon 0.07 parts Lamoreaux catalyst was added and the batch was then heated to 55° C. for two hours under vacuum, with stirring, whereupon it was cooled to below 40° C. In the following five examples the blends were identical except for varying amounts of diallylmaleate inhibitor (DAM). The diallylmaleate was added and stirred vigorously into the silicone fluid at ambient pressure to complete processing. Example No. 5 illustrates the properties of a silicone fluid utilizing a blend of 0.4% vinyl acetate plus 0.4% TAIC as an inhibitor instead of DAM.

Cure performance was ascertained by mixing each of the above-described blends with approximately three parts by weight of the trimethyl chainstopped polymethylhydrogen siloxane fluid crosslinking agent having approximately 100% by weight SiH groups and having a viscosity of approximately 40 centipoise at 25° C. This blend was then immediately coated without a solvent onto forty pound supercalendered kraft paper by means of a doctor blade and the coated silicone was cured in a forced-air oven.

The resulting films were then evaluated for extent of cure by qualitatively determining the silicone surfaces' rub-off, smear, migration, and release characteristics. Rub-off occurs when a silicone coating fails to adhere to the substrate and can be rubbed off in little balls of silicone by gentle finger pressure. Smear is detected in an incompletely cure coating when a finger firmly pressed across the silicone film leaves an obvious, permanent streak. Migration is detected by the Scotch (Reg. Trademark) cellophane tape test. The coating is considered well-cured and migration-free if a piece of No. 610 Scotch Tape will stick to itself after having been first firmly pressed into the silicone coating, then removed and doubled back on itself. If a silicone coating can be shown to be migration-free by means of the Scotch Tape test it is presumed to be a release coating, as it has been shown to adhere to the substrate with an adhesive force much greater than the adhesive force between the cured composition and the released aggressive Scotch Tape adhesive. These qualitative tests are well known to persons skilled in the art and are universally employed to ascertain the completeness of cure in silicone paper release coatings.

Cure performance was evaluated by noting the minimum oven dwell time required to achieve a well cured release coating.

TABLE I

| Example | % DAM | % Vinyl Acetate + TAIC | Minimum Cure Time at 350° F. | at 300° F. | Initial Viscosity | Catalized Viscosity and % Increase (centipoise) After 6 Hrs. | After 24 Hrs. |
|---|---|---|---|---|---|---|---|
| 1 | 0.50 | — | 10-15 sec. | 20 sec. | 239 cps | 248 cps (4%) | 250 cps (5%) |
| 2 | 0.25 | — | 10-15 | 20-25 | 254 | 250 (—) | 271 (7%) |
| 3 | 0.10 | — | 10-15 | 20 | 257 | 321 (25%) | 800 (211%) |
| 4 | 0.05 | — | 10 | 20-25 | 263 | 2100 (698%) | GEL |
| 5 | — | 0.80% | 10-15 | 25-30 | 207 | 231 (12%) | 250 (21%) |

Thus, it can be seen that the cure performance of the diallylmaleate-containing solventless release composition is comparable to that of the previously used commercial product as shown in Example 5. The viscosity increase as a function of time is an indication of the efficiency of diallylmaleate as an inhibitor. The viscosities were determined for catalyzed samples left undisturbed at 75° F.

The above results demonstrate that diallylmaleate levels of 0.1 to 0.50% will furnish excellent pot-life at room temperatures to platinum catalyzed solventless paper release compostions without sacrifice of acceptable cure performance.

EXAMPLES 6 TO 11

A means of ascertaining the gel time of catalyzed coating baths at elevated temperatures has been developed so as to provide a further indication of workable pot-life for these compositions. Ten grams of a dimethylvinyl chainstopped polydimethylvinyl-methylvinylsiloxane copolymer solventless silicone fluid as described in Examples 1 to 5 containing about 25 ppm Lamoreaux platinum catalyst was weighed into a 100 ml beaker and was mixed with various known amounts of diallylmaleate. The beaker was placed in a constant temperature water bath controlled at 140°±2° F. and allowed to stand for about 30 minutes to come to test temperature. Then, 0.3 grams methylhydrogen fluid crosslinker was introduced into the test polymer with a syringe and thoroughly mixed. A stopwatch timer was started coincident with the addition of crosslinker. The test mixture was stirred with an overhead stirrer until it gelled. The gellation time was noted, thus providing a fast reliable check of catalyzed pot-life at elevated temperatures for these coating compositions. The 140° F. bath life for standard coating composition blends which is presented in Table 2 as a function of diallylmaleate concentration is determined by the method described above wherein Example 11 is a control sample utilizing 0.4% TAIC and 0.4% vinyl acetate inhibitor instead of diallylmaleate.

TABLE II

| Example | DAM Level | 140° Gel Time |
|---|---|---|
| 6 | 500 ppm | 2 min |
| 7 | 1,000 | 8 |
| 8 | 2,000 | 115 |
| 9 | 2,500 | >115 |
| 10 | 3,000 | >115 |
| 11 | 0 | 10 |

It will be apparent from the foregoing that diallylmaleate concentrations of 2,000 ppm (0.2%) or more provide excellent pot-life for these coating compositions even at elevated temperatures. The 140° F. bath life performance of the diallylmaleate containing blends is far superior to that of the control sample which contained the TAIC and vinyl acetate inhibitor package formerly utilized in solventless paper release compositions.

EXAMPLES 12 TO 15

While providing excellent catalyzed room temperature pot-life for the solventless release compositions described above which contain 25 ppm platinum, diallylmaleate inhibitor also permits the use of higher levels of platinum in compositions which will then cure at much lower temperatures without sacrifice of useful pot-life. Another composition consisting of the same base polymer and crosslinker utilized in Examples 1 to 5 was prepared but included 200 ppm platinum as Lamoreaux catalyst and 5,000 ppm diallylmaleate inhibitor. The catalyzed bath life behaviour was ascertained at different temperatures in the same fashion as detailed in Examples 1 to 5. The results for this experimental composition compared with the results for a standard release composition (control) containing 25 ppm platinum catalyst plus 2500 ppm DAM inhibitor are tabulated below in Table III.

TABLE III

| | | % Viscosity Increase of the Catalyzed Composition After 7 Hours | |
|---|---|---|---|
| Example | Bath Temp. | Control Composition | 200 ppm Pt Composition |
| 12 | 74° F. | 4% | 29% |
| 13 | 84° F. | 5 | 31 |
| 14 | 100° F. | 18 | 105 |
| 15 | 120° F. | 114 | Gel after 3 Hrs. |

It will be apparent from the foregoing that 0.5% diallylmaleate (5000 ppm) prevents premature gellation of catalyzed coating baths below 100° F. ambient temperature despite the presence of as much as 200 ppm platinum catalyst.

EXAMPLES 16 TO 19

The effectiveness of bis-γ-propyltris (methoxy) silylmaleate as an inhibitor is demonstrated by blending varying amounts of the silylmaleate with some vinyl base polymer as utilized in Examples 1 through 5 above. The mixtures, which contain 25 ppm platinum catalyst were stirred at 25° C. under 25 mm Hg vacuum for one hour. The experimental blends were then mixed with 3% methylhydrogen fluid crosslinker and then coated onto 40 pound SCK paper with a doctor blade and cured to a smear- and migration-free abhesive surface, as described above. The minimum oven dwell time required for satisfactory cure, as well as the gellation time of each complete coating bath are noted in Table IV, wherein Example 19 contains no inhibitor, for comparison purposes.

TABLE IV

| Example | % Silyl Maleate | Cure Time at 350° F., sec | Pot-life at 75° F. |
|---|---|---|---|
| 16 | 1.0 | 15 | 36 hrs. |
| 17 | 0.25 | 10 | 1 hr. |
| 18 | 0.50 | 10 | 2.5 hrs. |
| 19 | 0.0 | 10 | 4.5 minutes |

The articles of manufacture intended by the present invention include but are in no manner limited to paper products with release coatings. When it is desirable to provide a material with a nonadherent surface, the compositions and methods of the present invention are often applicable. These compositions can likewise be utilized for applications requiring a reduction in friction between coated and non-coated surfaces.

Thus, it will be seen from the foregoing that the present invention provides novel compositions and methods for rendering materials and surfaces nonadherent to other materials which would normally adhere thereto, as well as novel articles of manufacture coated with these compositions by the above-described methods. Such compositions and articles have been shown to be particularly useful in release coating applications.

Additionally, both the shelf-life and the pot-life of these compositions can be effectively controlled and extended by the inclusion of the efficient and inexpensive inhibiting agent such as diallylmaleate.

The remarkable efficiency of diallylmaleate as an inhibitor for platinum-metal catalyzed vinyl or silanol addition cured 100% solids paper release formulations described herein makes diallylmaleate an effective additive for these products.

What is claimed as new and desired to be secured by Letters Patent of the United States is:

1. A silicone composition comprising:
   (a) a diorganopolysiloxane base polymer having up to approximately 20% by weight alkenyl or silanol functional groups and having a viscosity ranging from approximately 50 to approximately 100,000 centipoise at 25° C.;
   (b) a polymethylhydrogen siloxane fluid crosslinking agent having up to approximately 100% by weight SiH groups and having a viscosity in the range of approximately 25 to approximately 1000 centipoise at 25° C.;
   (c) an effective amount of precious metal catalyst for facilitating an addition cure hydrosilation reaction between said base polymer and said crosslinking agent; and
   (d) an amount of dialkyl carboxylic ester containing carbon to carbon unsaturation effective to inhibit the precious metal catalyzed hydrosilation cure reaction of said silicone composition at temperatures below the heat cure temperature of said silicone composition.

2. A silicone composition as in claim 1, wherein the dialkyl carboxylic ester is selected from the group consisting of diallylmaleate, diallylphthalate, diallylsuccinate and dialkylesters of maleic acid selected from the group consisting of dimethylmaleate, diethylmaleate and silylmaleate.

3. A solventless coating composition for rendering a material nonadherent to normally adherent other materials comprising:
   (a) a vinyl chainstopped diorganopolysiloxane base polymer having the formula

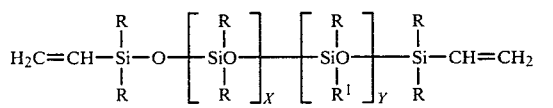

wherein R is a monovalent hydrocarbon radical free of unsaturation, R' is a hydrocarbon radical having alkenyl unsaturation, X and Y are positive integers so that the vinyl chainstopped diorganopolysiloxane has from approximately 0% to approximately 20% by weight R' groups, and having a viscosity ranging from approximately 50 to approximately 100,000 centipoise at 25° C.;
   (b) a trimethyl chainstopped polymethylhydrogen siloxane fluid crosslinking agent having from approximately 10% to approximately 100% by weight SiH groups and having a viscosity in the range of approximately 25 to approximately 1000 centipoise at 25° C.;
   (c) an effective amount of platinum catalyst for facilitating heat curing of said composition; and
   (d) an amount of diallylmaleate effective to inhibit the cure of said coating composition at temperatures below the heat cure temperature of said composition.

4. A coating composition as in claim 3, wherein said vinyl chainstopped diorganopolysiloxane has the formula

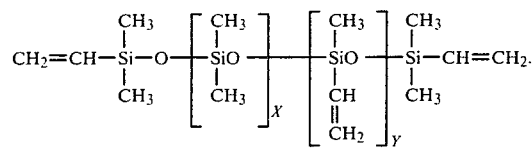

5. A coating composition as in claim 3, wherein the amount of catalyst is approximately 10 to approximately 500 ppm.

6. A coating composition as in claim 3, wherein the amount of diallylmaleate ranges from approximately 0.1% to approximately 0.5% by weight.

7. An article of manufacture comprising a base element bearing a heat-cured coating of the composition of claims 1, 2 or 3.

8. An aritlce of manufacture comprising a base element formed of a material selected from the group consisting of metal foil, glass, plastic and fibrous materials and having a surface portion coated with a heat-cured quantity of the composition of claims 1, 2 or 3.

9. An article of manufacture comprising paper coated with the composition of claims 1, 2 or 3.

10. A method for rendering a material nonadherent to normally adherent other materials comprising applying to the first said material an amount of solventless composition comprising:
   (a) a diorganopolysiloxane base polymer having up to approximately 20% by weight alkenyl or silanol functional groups and having a viscosity ranging from approximately 50 to approximately 100,000 centipoise at 25° C.;
   (b) a polymethylhydrogensiloxane fluid crosslinking agent having up to approximately 100% by weight SiH groups and having a viscosity in the range of approximately 25 to approximately 1000 centipoise at 25° C.;
   (c) an effective amount of precious metal catalyst for facilitating an addition cure hydrosilation reaction between said base polymer and said crosslinking agent; and
   (d) an amount of dialkyl carboxylic ester containing carbon to carbon unsaturation effective to inhibit the precious metal catalyzed hydrosilation cure reaction of said silicone composition at temperatures below the heat cure temperature of said silicone composition.

11. A method as in claim 10, wherein the dialkyl carboxylic ester is selected from the groups consisting of diallylmaleate, diallylphthalate, diallylsuccinate and dialkylesters of maleic acid selected from the group consisting of dimethylmaleate, diethylmaleate and silylmaleate.

12. A method for rendering a material nonadherent to normally adherent other materials comprising applying to the first said material an amount of a solventless composition comprising:
   (a) a vinyl chainstopped diorganopolysiloxane base polymer having the formula

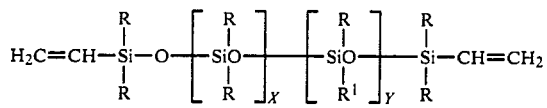

where R is a monovalent hydrocarbon radical free of unsaturation, R' is a hydrocarbon radical having alkenyl unsaturation, X and Y are positive integers so that the vinyl chain-stopped diorganopolysiloxane has from approximately 0% to approximately 20% by weight of R' groups and the viscosity of the polysiloxane ranges from approximately 50 to approximately 100,000 centipoise at 25° C.;

(b) trimethyl chainstopped polymethylhydrogen siloxane fluid crosslinking agent having from approximately 10% to approximately 100% SiH groups and having a viscosity in the range of approximately 25 to approximately 1000 centipoise at 25° C.;

(c) an effetive amount of platinum catlyst for facilitating heat curing of said composition; and (d) an amount of diallylmaleate effective to inhibit the cure of said coating composition at temperatures below the heat cure temperature of said composition.

13. A method as in claim 12, wherein said vinyl chain-stopped diorganopolysiloxane base polymer in the applied composition has the formula

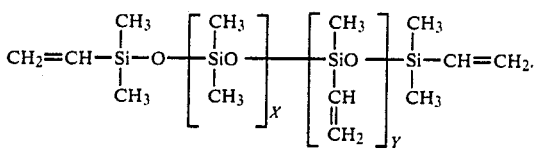

14. A method as in claim 12, wherein the amount of catalyst in the applied composition is approximately 10 to approximately 500 ppm.

15. A method as in claim 12, wherein the amount of diallylmaleate in the applied composition ranges from approximately 0.1% to approximately 0.5% by weight.

16. A method wherein the composition of claims 1 or 2 is applied to a material selected from the group consisting of metal foil, glass, plastic and fibrous material.

17. A method as in claim 12, wherein the solventless composition is applied to a material selected from the group consisting of metal foil, glass, plastic and fibrous materials.

18. A method as in claim 12, wherein said fibrous material is paper.

19. A method as in claim 10, wherein the silylmaleate is bis-γ-propyltris(methoxy)silylmaleate.

20. A silicone composition as in claim 2, wherein the silylmaleate is bis-γ-propyltris(methoxy)silylmaleate.

* * * * *